United States Patent
Mazandarany et al.

(10) Patent No.: US 10,575,347 B2
(45) Date of Patent: Feb. 25, 2020

(54) DELIVERY OF SHARED WIFI CREDENTIALS

(71) Applicant: Microsoft Technology Licensing, LLC, Redmond, WA (US)

(72) Inventors: Darya Mazandarany, Kirkland, WA (US); Triptpal Singh Lamba, Bothell, WA (US); Saumaya Sharma, Seattle, WA (US); Scott Michael Bragg, Snoqualmie, WA (US); Karan Khanna, Redmond, WA (US); Scott A. Inglis, Snoqualmie, WA (US); Javier Flores Assad, Bothell, WA (US); Fatima Taher Calcuttawala, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 644 days.

(21) Appl. No.: 14/071,121

(22) Filed: Nov. 4, 2013

(65) Prior Publication Data

US 2015/0124791 A1   May 7, 2015

(51) Int. Cl.
  *H04W 76/11* (2018.01)
  *H04W 12/04* (2009.01)
  (Continued)

(52) U.S. Cl.
  CPC ............ *H04W 76/11* (2018.02); *H04W 12/04* (2013.01); *H04W 4/12* (2013.01); *H04W 4/21* (2018.02);
  (Continued)

(58) Field of Classification Search
  CPC .............................. H04W 76/021; H04W 4/12
  See application file for complete search history.

(56) References Cited

U.S. PATENT DOCUMENTS 6,442,687 B1   8/2002 Savage
7,640,579 B2  12/2009 Shewchuk et al.
(Continued)

FOREIGN PATENT DOCUMENTS

CN   102739643 A   10/2012
CN   102970732 A    3/2013
(Continued)

OTHER PUBLICATIONS

"Easily Share Your Wi-Fi Credentials in iOS with QuickWiFi Web App," Retrieved at <<http://iphone.pandaapp.com/news/01052012/003120450.shtml#.UZxdGrWcXHo>>, Jan. 4, 2012, pp. 1-4.
(Continued)

*Primary Examiner* — Maung T Lwin
*Assistant Examiner* — Suman Debnath
(74) *Attorney, Agent, or Firm* — Medley, Behrens & Lewis, LLC

(57) ABSTRACT

Various technologies described herein pertain to delivering shared WiFi credentials. According to various embodiments, at least one server computing device is configured to transmit shared WiFi credentials to a mobile device. The at least one server computing device receives a request, where the request includes data that identifies the mobile device. Moreover, the request indicates that the mobile device desirably receives credentials for a shared WiFi network. Responsive to receiving the request, the at least one server computing device determines that the mobile device is authorized to receive the credentials for the shared WiFi network based at least in part upon the data that identifies the mobile device. Moreover, the at least one server computing device transmits the credentials for the shared WiFi network to the mobile device responsive to determining that the mobile device is authorized to receive the credentials for the shared WiFi network.

20 Claims, 12 Drawing Sheets

(51) Int. Cl.
  *H04W 4/21*    (2018.01)
  *H04W 84/12*   (2009.01)
  *H04W 12/00*   (2009.01)
  *H04W 4/12*    (2009.01)

(52) U.S. Cl.
  CPC .............. *H04W 12/00403* (2019.01); *H04W 12/00502* (2019.01); *H04W 12/00503* (2019.01); *H04W 12/00522* (2019.01); *H04W 84/12* (2013.01)

(56) References Cited

U.S. PATENT DOCUMENTS

| | | | |
|---|---|---|---|
| 7,802,293 B2 | 9/2010 | Boyer et al. | |
| 7,913,084 B2 | 3/2011 | Medvinsky et al. | |
| 7,958,544 B2 | 6/2011 | Chen et al. | |
| 2011/0187505 A1 | 8/2011 | Faith et al. | |
| 2012/0110643 A1 | 5/2012 | Schmidt et al. | |
| 2012/0266217 A1* | 10/2012 | Kaal | H04L 63/0407 726/4 |
| 2012/0284785 A1* | 11/2012 | Salkintzis | G06F 21/43 726/7 |
| 2013/0014232 A1* | 1/2013 | Louboutin | H04M 1/72527 726/5 |
| 2013/0084835 A1* | 4/2013 | Scherzer | H04W 48/14 455/414.1 |
| 2013/0115915 A1 | 5/2013 | Tipton et al. | |
| 2013/0314334 A1* | 11/2013 | Leica | H04B 5/0031 345/173 |
| 2014/0092813 A1* | 4/2014 | Jaakkola | H04W 48/16 370/328 |
| 2014/0269614 A1* | 9/2014 | Maguire | H04W 4/80 370/331 |
| 2015/0047000 A1* | 2/2015 | Spencer, III | H04L 63/0876 726/7 |

FOREIGN PATENT DOCUMENTS

| | | |
|---|---|---|
| CN | 103369527 A | 10/2013 |
| EP | 2657878 A2 | 10/2013 |
| WO | 2010038114 A1 | 4/2010 |
| WO | 2012164328 A1 | 12/2012 |
| WO | 2013154493 A1 | 10/2013 |

OTHER PUBLICATIONS

"International Search Report (ISR) and Written Opinion for PCT Patent Application No. PCT/US2014/063017", dated Feb. 4, 2015, 11 pages.

"Response to the International Search Report (ISR) and Written Opinion for PCT Patent Application No. PCT/US2014/063017", Filed Date: May 7, 2015, 13 pages.

"Written Opinion of the International Preliminary Examining Authority for PCT Patent Application No. PCT/US2014/063017", dated Sep. 23, 2015, 6 pages.

"Notification of the Transmittal of the International Preliminary Report on Patentability for PCT Patent Application No. PCT/US2014/063017", dated Jan. 29, 2016, 16 pages.

"Communication Pursuant to Rules 161(1) and 162 EPC for European Patent Application No. 14802251.0", dated Jun. 17, 2016, 2 pages.

"Response to Communication in Relation to Rules 161(1) and 162 EPC for European Patent Application No. 14802251.0", dated Jun. 30, 2016, 18 pages.

"Office Action Issued in European Patent Application No. 14802251.0", dated Jan. 18, 2018, 5 Pages.

"Office Action Issued in European Patent Application No. 14802251.0", dated Sep. 10, 2018, 5 Pages.

"First Office Action and Search Report Issued in Chinese Patent Application No. 201480060458.4", dated Aug. 14, 2018, 16 Pages.

"Second Office Action Issued in Chinese Patent Application No. 201480060458.4", dated Mar. 13, 2019, 8 Pages.

\* cited by examiner

DELIVERY OF SHARED WIFI CREDENTIALS

BACKGROUND

Wireless fidelity (WiFi) networks have generally increased in popularity. By way of example, WiFi networks have become more prevalent in homes, businesses, public areas, and so forth. A computing device, for instance, can connect to and exchange data via a WiFi network. When connected to the WiFi network, the computing device may use and/or access various network resources made available on the WiFi network, such as the Internet, network attached storage, printers, other computing devices on the WiFi network, and so forth.

A WiFi network typically has a set of credentials utilized to enable access to such WiFi network. The credentials, for instance, can include a service set identifier (SSID), a basic service set identifier (BSSID), a network key, and so forth. For instance, the network key can be a Wired Equivalent Privacy (WEP) key, a WiFi Protected Access (WPA) key, a WiFi Protected Access II (WPA2) key, a Counter Cipher Mode with Block Chaining Message Authentication Code Protocol (CCMP) key, an Advanced Encryption Standard (AES) key, or the like. As an example, credentials for a particular WiFi network can include an SSID and WPA key that can be used by a computing device to identify and access the particular WiFi network associated with the SSID.

Conventional approaches for distributing WiFi credentials oftentimes involve an owner of a WiFi network (or someone else who has knowledge of the WiFi credentials) providing the WiFi credentials to a disparate user to enable the disparate user to access the WiFi network. By way of illustration, an owner of a WiFi network can provide a disparate user with the WiFi credentials for the WiFi network at his house when the disparate user comes to visit. Yet, it may be difficult for the owner to remember the WiFi credentials, distracting to the owner to be interrupted by the disparate user who desires to access the WiFi network, and time-consuming for both the owner and the disparate user.

SUMMARY

Described herein are various technologies that pertain to delivering shared WiFi credentials. According to various embodiments, at least one server computing device can be configured to transmit shared WiFi credentials to a mobile device. The at least one server computing device can receive a request, where the request includes data that identifies the mobile device. Moreover, the request can indicate that the mobile device desirably receives credentials for a shared WiFi network. Responsive to receiving the request, the at least one server computing device can determine that the mobile device is authorized to receive the credentials for the shared WiFi network based at least in part upon the data that identifies the mobile device. Moreover, the at least one server computing device can transmit the credentials for the shared WiFi network to the mobile device responsive to determining that the mobile device is authorized to receive the credentials for the shared WiFi network.

According to various embodiments, a mobile device can transmit a request that includes data that identifies the mobile device. The request can indicate that the mobile device desirably receives credentials for a shared WiFi network. Moreover, the credentials for the shared WiFi network can be received responsive to the request. By way of example, the mobile device can transmit the request to and/or receive the credentials from at least one server computing device. Pursuant to another example, the mobile device can transmit the request to and/or receive the credentials from a disparate device, where the disparate device can be a computing device that grants access to the shared WiFi network or a network device (e.g., wireless access point) associated with the shared WiFi network. Further, the mobile device can access the shared WiFi network using the credentials for the shared WiFi network.

In accordance to various embodiments, credentials for a shared WiFi network (or respective credentials for a plurality of shared WiFi networks) can be delivered via various mechanisms to a mobile device. Such mechanisms can be based on, for example, geographic location of the mobile device or a physical gesture between the mobile device and a disparate device. Other exemplary mechanisms for delivering credentials include use of a scanned barcode associated with the shared WiFi network, a short message service (SMS) message, an email message, a text-based message sent via an online social networking service, geocaching, or the like.

In accordance with various embodiments, the credentials that are delivered to the mobile device can be masked; yet, it is to be appreciated that the credentials need not be masked. A token can be shared with the mobile device instead of the credentials pursuant to various embodiments. Further, temporary credentials can be delivered for sharing a WiFi network for a limited period of time or a limited number of accesses; however, the claimed subject matter is not limited to the credentials being temporary. According to another example, shared WiFi credentials previously delivered to a mobile device can be automatically updated when changed for a shared WiFi network.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
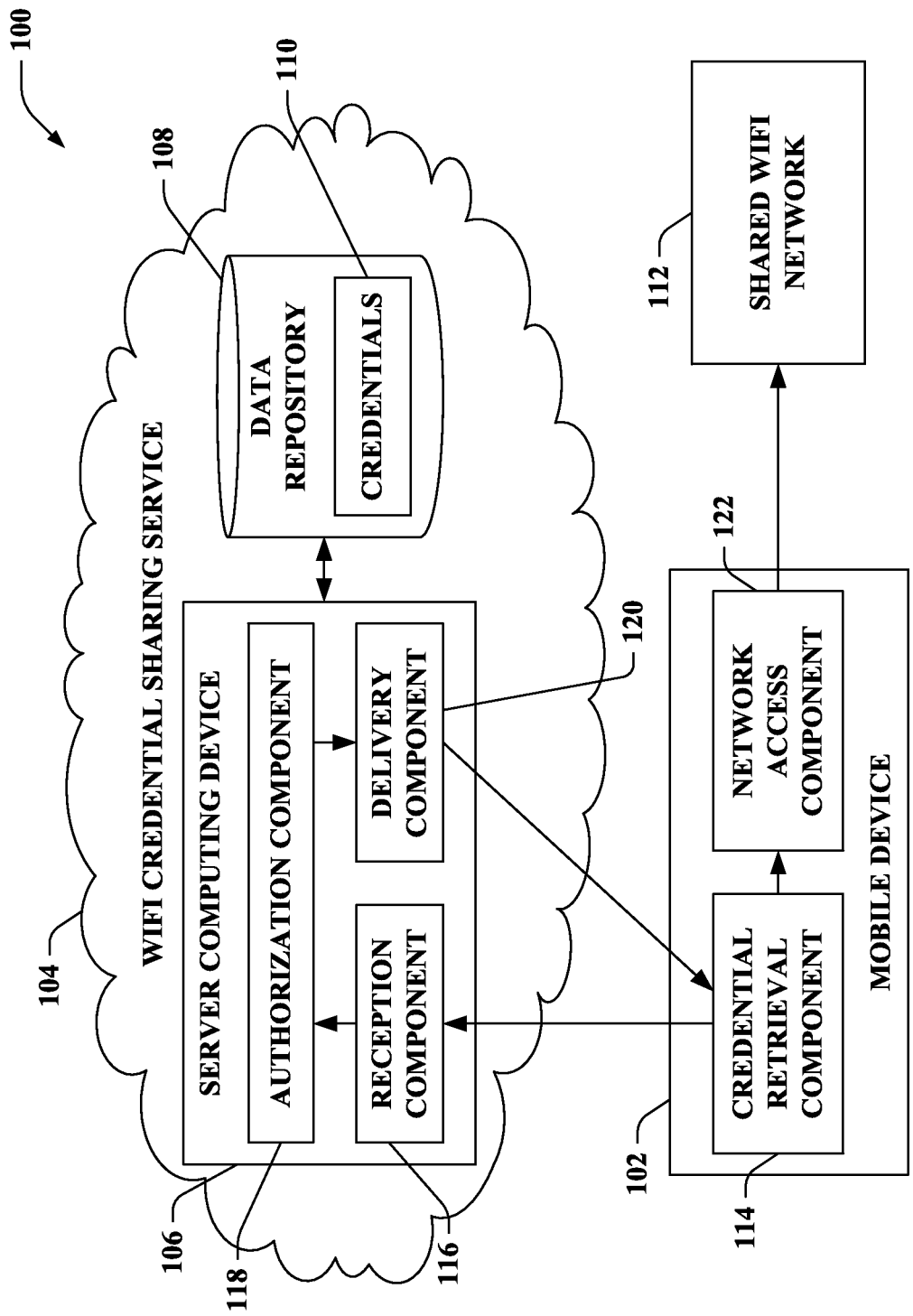
FIG. 1 illustrates a functional block diagram of an exemplary system that delivers shared WiFi credentials to a mobile device.

Various technologies pertaining to delivering credentials for a shared WiFi network to a mobile device are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that delivers shared WiFi credentials to a mobile device 102. The system 100 includes a WiFi credential sharing service 104, which further includes at least one server computing device 106 and a data repository 108. The data repository 108 can retain credentials 110 for a shared WiFi network 112. According to an example, the credentials 110 can include an SSID, a BSSID, a network key, a location, and so forth for the shared WiFi network 112. It is to be appreciated that the credentials 110 can be encrypted in the data repository 108. Moreover, although not shown, it is contemplated that the data repository 108 can include credentials for substantially any number of other shared WiFi networks.

The mobile device 102, for example, can be a mobile phone (e.g., smartphone), a tablet computer, a handheld computer, a laptop computer, a wearable computer, a personal digital assistant (PDA), a portable gaming device, an in-vehicle communications and infotainment system, or the like. The mobile device 102 can include a credential retrieval component 114 that can transmit a request to the server computing device 106. The request can include data that identifies the mobile device 102. Moreover, the request can indicate that the mobile device 102 desirably receives credentials for the shared WiFi network 112.

The server computing device 106 can include a reception component 116 that receives the request from the mobile device 102 (e.g., from the credential retrieval component 114 of the mobile device 102). Moreover, the server computing device 106 can include an authorization component 118 that, responsive to the reception component 116 receiving the request from the mobile device 102, determines that the mobile device 102 is authorized to receive the credentials 110 for the shared WiFi network 112 based at least in part upon the data that identifies the mobile device 102. The server computing device 106 can further include a delivery component 120 that transmits the credentials 110 for the shared WiFi network 112 to the mobile device 102 responsive to determining that the mobile device 102 is authorized to receive the credentials 110 for the shared WiFi network 112.

The credential retrieval component 114 of the mobile device 102 can receive the credentials 110 for the shared WiFi network 112 sent by the delivery component 120 of the server computing device 106 responsive to the request. Moreover, the mobile device 102 can include a network access component 122 that can access the shared WiFi network 112 using the credentials 110 for the shared WiFi network 112.

It is contemplated that the authorization component 118 of the server computing device 106 can utilize various mechanisms to determine whether the mobile device 102 is authorized to receive the credentials 110 for the shared WiFi network 112 responsive to receiving the request. By way of example, the authorization component 118 can determine that the mobile device 102 is authorized to receive the credentials 110 for the shared WiFi network 112 based upon a social network relationship with a user of the mobile device 102. Following such example, the user of the mobile device 102 can be detected by the authorization component 118 from the data that identifies the mobile device 102. Moreover, the social network relationship between the user of the mobile device 102 and an owner of the shared WiFi network 112 can be determined. Based upon such social network relationship, the authorization component 118 can determine that the mobile device 102 is authorized to receive the credentials 110 for the shared WiFi network 112. According to another example, the authorization component 118 can determine that the mobile device 102 is authorized to receive the credentials 110 for the shared WiFi network 112 by transmitting an inquiry to a computing device that grants access to the shared WiFi network 112. Responsive to the inquiry, the authorization component 118 can receive a response from the computing device that indicates that the mobile device 102 is authorized to receive the credentials 110 for the shared WiFi network 112; alternatively, if the mobile device 102 is not authorized to receive the credentials 110 for the shared WiFi network 112, the authorization component 118 can receive a response from the computing device indicating that the mobile device 102 is not authorized to receive the credentials 110.

According to an example, the credentials 110 delivered to the mobile device 102 for the shared WiFi network 112 can enable the mobile device 102 to share access to the Internet only via the shared WiFi network 112. Thus, the mobile device 102 may be unable to access other network resources of the shared WiFi network 112 using the credentials 110 received from the WiFi credential sharing service 104. Examples of other resources that may be unavailable to the mobile device 102 using the credentials 110 received from the WiFi credential sharing service 104 include access to network printers, network attached storage devices, other computing devices on the shared WiFi network 112, and so forth. However, pursuant to other examples, it is contemplated that other network resource(s) in addition to or instead of the Internet can be available to the mobile device 102 when using the credentials 110 received from the WiFi credential sharing service 104.

As noted above, the credentials 110 for the shared WiFi network 112 can be encrypted in the data repository 108. Moreover, when transmitted by the delivery component 120 of the server computing device 106 to the credential retrieval component 114 of the mobile device 102, the credentials 110 can continue to be encrypted. Further, the credentials 110 for the shared WiFi network 112 can be masked on the mobile device 102. Accordingly, the credentials 110 may not be displayable on the mobile device 102. The network access component 122 can decrypt the credentials 110 for the shared WiFi network 112 when accessing the shared WiFi network 112 using the credentials 110; yet, the credentials 110 can continue to be masked on the mobile device 102.

According to various embodiments, the credentials 110 for the shared WiFi network 112 can be temporary credentials that expire after a predetermined duration of time or a preset number of uses for access to the shared WiFi network 112. For instance, the predetermined duration of time or the preset number of uses can be set for the credentials 110 (e.g., by an owner of the shared WiFi network 112, etc.). Accordingly, the network access component 122 can employ the credentials 110 received from the WiFi credential sharing service 104 for the predetermined duration of time or the preset number of uses for access to the shared WiFi network 112. However, it is to be appreciated that the claimed subject matter is not limited to the credentials 110 for the shared WiFi network 112 being temporary credentials; hence, according to other embodiments, it is contemplated that the credentials 110 can be utilized for substantially any number of uses for access to the shared WiFi network 112 and/or the duration of time for access to the shared WiFi network 112 need not be limited.

The credentials 110 for the shared WiFi network 112 can be delivered to the mobile device 102 via various mechanisms. Examples of such mechanisms include use of a short message service (SMS) message, an email message, a text-based message sent via an online social networking service, a barcode associated with the shared WiFi network 112, geocaching, or the like. In accordance with other examples, the credentials 110 can be delivered responsive to a physical gesture of the mobile device 102 (e.g., a physical gesture between the mobile device 102 and a disparate device associated with the shared WiFi network 112) or using a mechanism based upon a detected geographic location of the mobile device 102. Moreover, it is contemplated that a combination of the aforementioned mechanisms can be utilized to deliver the credentials 110 to the mobile device 102.

According to an example, the credential retrieval component 114 of the mobile device 102 can send the request to the reception component 116 of the server computing device 106 as part of an SMS message. Additionally or alternatively, the delivery component 120 of the server computing device 106 can transmit the credentials 110 for the shared WiFi network 112 to the credential retrieval component 114 of the mobile device 102 via an SMS message.

By way of another example, the credential retrieval component 114 of the mobile device 102 can send the request to the reception component 116 of the server computing device 106 as part of an email message. Additionally or alternatively, the delivery component 120 of the server computing device 106 can send the credentials 110 for the shared WiFi network 112 to the credential retrieval component 114 of the mobile device 102 as part of an email message.

Pursuant to a further example, the credential retrieval component 114 of the mobile device 102 can send the request to the reception component 116 of the server computing device 106 as part of a text-based message sent via an online social networking service from the mobile device 102. Additionally or alternatively, the delivery component 120 of the server computing device 106 can transmit the credentials 110 for the shared WiFi network 112 to the credential retrieval component 114 of the mobile device 102 as part of a text-based message sent via an online social networking service from the server computing device 106.

According to various embodiments, it is contemplated that the credential retrieval component 114 of the mobile device 102 can receive the credentials 110 for the shared WiFi network 112 as part of a token. The network access component 122 can use the token to access the shared WiFi network 112. For instance, the token can be shared instead of the credentials 110. Thereafter, the token can be utilized by the network access component 122 to unlock the credentials 110. For example, substantially any type of algorithm can be utilized to regenerate the credentials 110 based upon the token. By way of yet another example, the token can include a link that can be followed to allow access to the credentials 110 for the shared WiFi network 112.

Figure 2:
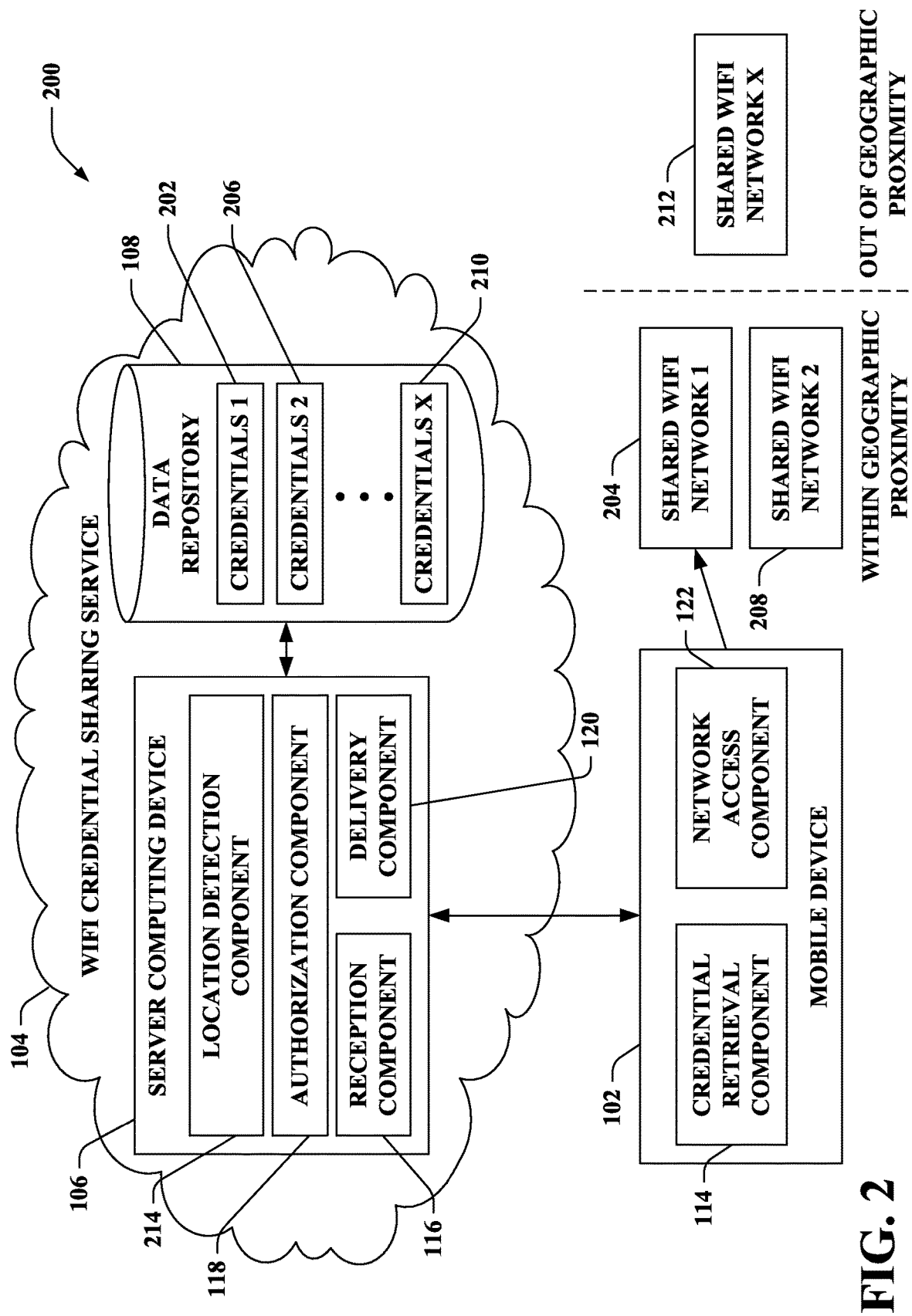
FIG. 2 illustrates a functional block diagram of an exemplary system that delivers credentials for shared WiFi networks based upon a geographic location of the mobile device.

Now turning to FIG. 2, illustrated is a system 200 that delivers credentials for shared WiFi networks based upon a geographic location of the mobile device 102. The system 200 predelivers WiFi credentials for shared WiFi network(s) that are within a limited geographic region or within proximity of the mobile device 102. The system 200 includes the WiFi credential sharing service 104, which includes one or more server computing devices 106 and the data repository 108. The data repository 108 retains credentials 1 202 for a shared WiFi network 1 204, credentials 2 206 for a shared WiFi network 2 208, . . . , and credentials X 210 for a shared WiFi network X 212, where X can be substantially any integer.

The server computing device 106 can include the reception component 116, the authorization component 118 and the delivery component 120 as described herein. Moreover, the server computing device 106 can include a location detection component 214 that can identify a geographic location of the mobile device 102 responsive to receipt of the request by the reception component 116 from the mobile device 102. The location detection component 214 can further determine shared WiFi network(s) that are within geographic proximity of the mobile device 102 based upon the identified geographic location of the mobile device 102. In the context of the system 200, geographic proximity, for example, can be within a common spatial region such as a common country, region of a country, state, region of a state, county, city, region of a city, neighborhood, street, or the like as compared to the mobile device 102. According to another example, geographic proximity can be within a predefined distance of the mobile device 102. By way of yet another example, geographic proximity can be the Y nearest located shared WiFi networks to the mobile device 102, where Y is substantially any integer.

According to the illustrated example shown in FIG. 2, the location detection component 214 can determine that the mobile device 102 is within geographic proximity of the shared WiFi network 1 204 and the shared WiFi network 2 208, while being outside of geographic proximity of the shared WiFi network X 212, based at least in part upon the geographic location of the mobile device 102. Following this example, the delivery component 120 can deliver the credentials 1 202 and the credentials 2 206 for the shared WiFi network 1 204 and the shared WiFi network 2 208, respectively, to the mobile device 102 responsive to determining that the mobile device 102 is within geographic proximity of the shared WiFi network 1 204 and the shared WiFi network 2 208 and authorized to receive the credentials for such shared WiFi networks. Moreover, the delivery component 120 can be inhibited from delivering the credentials X 210 for the shared WiFi network X 212 to the mobile device 102. Similarly, the delivery component 120 can be inhibited from delivering credentials for shared WiFi network(s) that the mobile device 102 is not authorized to receive.

The credential retrieval component 114 of the mobile device 102 can receive respective credentials for a plurality of shared WiFi networks from the server computing device 106 that are within geographic proximity of the mobile device 102. Further, the network access component 122 can select to access a particular shared WiFi network from the plurality of shared WiFi networks. For instance, as depicted in FIG. 2, the network access component 122 can select to access the shared WiFi network 1 204. The network access component 122 can select to access the particular shared WiFi network based upon geographic locations of the shared WiFi networks for which respective credentials are received, signal strengths of the shared WiFi networks for which respective credentials are received, available bandwidths supplied by the shared WiFi networks for which respective credentials are received, user input, preset preferences, the like. Further, the network access component 122 can access the particular shared WiFi network using respective credentials for the particular shared WiFi network received from the server computing device 106.

In the system 200, the credentials of shared WiFi network(s) within geographic proximity of the mobile device 102 can be pre-cached on the mobile device 102 (e.g., the credentials 1 202 of the shared WiFi network 1 204 and the credentials 2 206 of the shared WiFi network 2 208 can be pre-cached on the mobile device 102). By way of illustration, when the mobile device 102 is geographically located in a first city, a first set of credentials for a first set of shared WiFi networks can be predelivered by the delivery component 120 to the mobile device 102 based upon the location detection component 214 detecting the mobile device 102 within the first city. Since the first set of credentials are pre-cached on the mobile device 102, while the mobile device 102 is located in the first city, the network access component 122 can use credentials from the first set of credentials to access one or more of the shared WiFi networks in the first set of shared WiFi networks (e.g., without subsequent transmission of credentials by the delivery component 120, etc.). Following this illustration, the location detection component 214 can thereafter identify that the mobile device 102 has moved to a second city. Accordingly, a second set of credentials for a second set of shared WiFi networks can be predelivered to the mobile device 102 based upon the location detection component 214 detecting the mobile device 102 within the second city, and so forth.

By way of example, geospatial tiles can be retained in the data repository 108. A particular geospatial tile can include credentials for shared WiFi networks within a corresponding spatial region that the mobile device 102 is authorized to receive. By way of illustration, a first geospatial tile (corresponding to a first spatial region) retained in the data repository 108 for the mobile device 102 can include the credentials 1 202 for the shared WiFi network 1 204 and the credentials 2 206 for the shared WiFi network 2 208, a second geospatial tile (corresponding to a second spatial region) retained in the data repository 108 for the mobile device 102 can include the credentials X 210 for the shared WiFi network X 212, and so forth. Thus, when the location detection component 214 determines that the mobile device 102 is within the first spatial region, the delivery component 120 can send credentials included in the first geospatial tile to the mobile device 102 (e.g., the credentials 1 202 and the credentials 2 206), etc.; yet, the claimed subject matter is not limited to the foregoing example.

Figure 3:
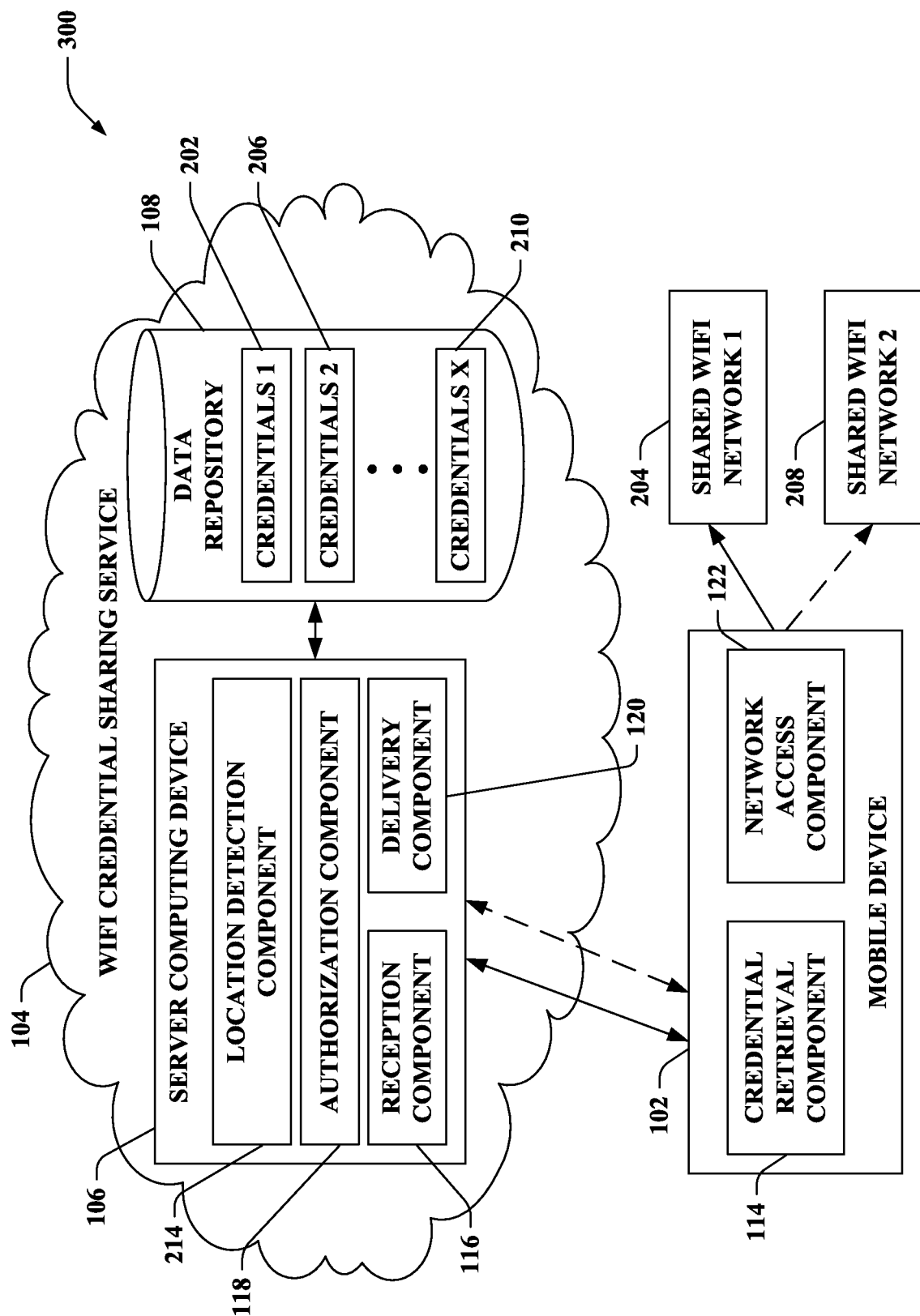
FIG. 3 illustrates a functional block diagram of another exemplary system that delivers credentials for shared WiFi networks based upon the geographic location of the mobile device.

With reference to FIG. 3, illustrated is a system 300 that delivers credentials for shared WiFi networks based upon a geographic location of the mobile device 102. In contrast to the system 200 of FIG. 2 which pre-caches credentials for shared WiFi networks on the mobile device 102, the system 300 can provide just-in-time delivery of credentials for shared WiFi networks to the mobile device 102. The system 300 includes the WiFi credential sharing service 104, which includes one or more server computing devices 106 and the data repository 108. Again, the server computing device 106 can include the reception component 116, the authorization component 118, the location detection component 214, and the delivery component 120. Moreover, the mobile device 102 can include the credential retrieval component 114 and the network access component 122.

The credential retrieval component 114 of the mobile device 102 can transmit a request to the server computing device 106. Responsive to the reception component 116 receiving the request, the location detection component 214 can identify the geographic location of the mobile device 102. Moreover, the location detection component 214 can determine that the mobile device 102 is within geographic proximity of the shared WiFi network 1 204 based at least in part upon the geographic location of the mobile device 102. In the context of the system 300, geographic proximity can refer to a coverage area of a shared WiFi network. Further, the authorization component 118 can determine that the mobile device 102 is authorized to receive the credentials 1 202 for the shared WiFi network 1 204 based at least in part upon data that identifies the mobile device 102. Thus, the delivery component 120 can transmit the credentials 1 202 for the shared WiFi network 1 204 to the mobile device 102 responsive to determining that the mobile device 102 is within geographic proximity of the shared WiFi network 1 204 and authorized to receive the credentials 1 202 for the shared WiFi network 1 204. Upon receiving the credentials 1 202, the network access component 122 can use the credentials 1 202 to access the shared WiFi network 1 204.

Moreover, the location detection component 214 can continue to track the geographic location of the mobile device 102. For instance, the location detection component 214 can continuously detect the geographic location of the mobile device 102, periodically detect the geographic location of the mobile device 102, or the like. By way of example, the location detection component 214 can determine that the mobile device 102 has moved within geographic proximity of the shared WiFi network 2 208. Additionally or alternatively, the location detection component 214 can determine that the mobile device 102 has moved out of geographic proximity of the shared WiFi network 1 204. Moreover, the authorization component 118 can determine that the mobile device 102 is authorized to receive the credentials 2 206 for the shared WiFi network 2 208. Accordingly, the delivery component 120 can deliver the credentials 2 206 for the shared WiFi network 2 208 to the mobile device 102. Responsive to receiving the credentials 2 206, the network access component 122 can use the credentials 2 206 to access the shared WiFi network 2 208.

Figure 4:
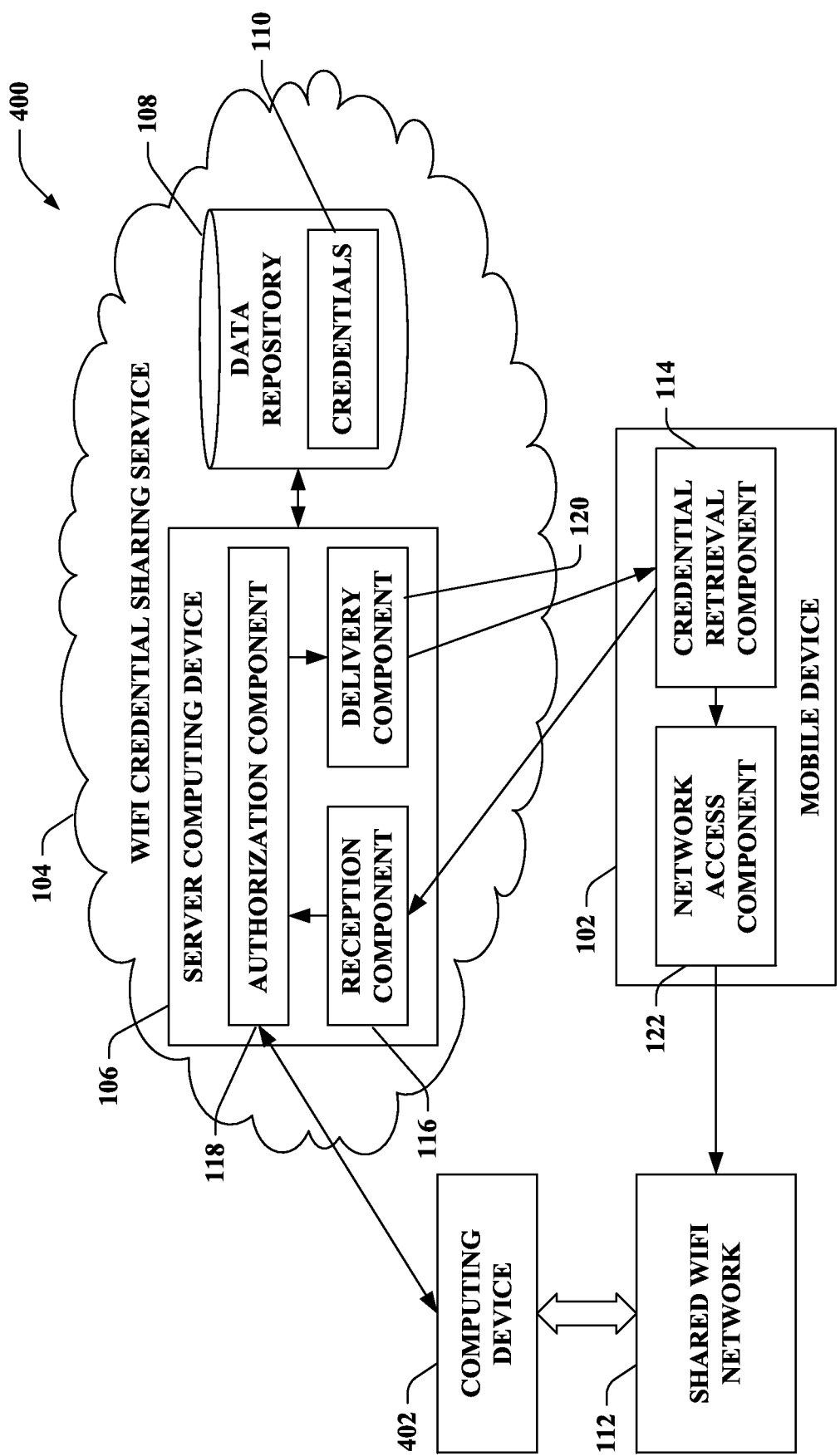
FIG. 4 illustrates a functional block diagram of an exemplary system that pushes a notification that prompts a user to grant or deny access for the mobile device to the shared WiFi network.

Turning to FIG. 4, illustrated is a system 400 that pushes a notification that prompts a user to grant or deny access for the mobile device 102 to the shared WiFi network 112. The system 400 includes the WiFi credential sharing service 104, the mobile device 102, and the shared WiFi network 112 as described herein. Moreover, the system 400 includes a computing device 402 that grants access to the shared WiFi network 112. For instance, the computing device 402 can be a computing device of an owner of the shared WiFi network 112 or a disparate user authorized to permit or deny access to the shared WiFi network 112.

According to the example set forth in FIG. 4, the authorization component 118 can transmit an inquiry to the computing device 402 that grants access to the shared WiFi network 112. The inquiry can indicate that the mobile device 102 desirably receives the credentials 110 for the shared WiFi network 112. The inquiry sent by the authorization component 118 can solicit an acknowledgment from a user of the computing device 402. The computing device 402 can receive the inquiry and display information pertaining to the inquiry on a display screen of the computing device 402. For instance, the information pertaining to the inquiry can solicit input from the user of the computing device 402 to grant or deny access for the mobile device 102 to the shared WiFi network 112.

According to an example, the inquiry can specify a social network relationship between the user of the mobile device 102 and the user of the computing device 402 (e.g., indicate that the user of the mobile device 102 is a friend of a friend of the user of the computing device 402, etc.). Following this example, the social network relationship can be displayed on the display screen of the computing device 402 when soliciting the input from the user of the computing device 402 to grant or deny access for the mobile device 102 to the shared WiFi network 112. Yet, the claimed subject matter is not limited to such example.

Responsive to the inquiry, the computing device 402 can transmit a response to the server computing device 106 (e.g., the authorization component 118) that indicates that the mobile device 102 is authorized to receive the credentials 110 for the shared WiFi network 112 (e.g., in response to the user of the computing device 402 granting access for the mobile device 102 to the shared WiFi network 112). Alternatively, if the user of the computing device 402 denies access for the mobile device 102 to the shared WiFi network 112, then the computing device 402 can transmit a response to the server computing device 106 (e.g., the authorization component 118) that indicates that the mobile device 102 is not authorized to receive the credentials 110 for the shared WiFi network 112. Accordingly, push-based notifications can prompt the user of the computing device 402 to share the shared WiFi network 112 with the mobile device 102.

Moreover, it is contemplated that the computing device 402 need not be connected to the shared WiFi network 112 when the inquiry is received from the authorization component 118 and/or the response to the inquiry is sent to the authorization component 118.

Figure 5:
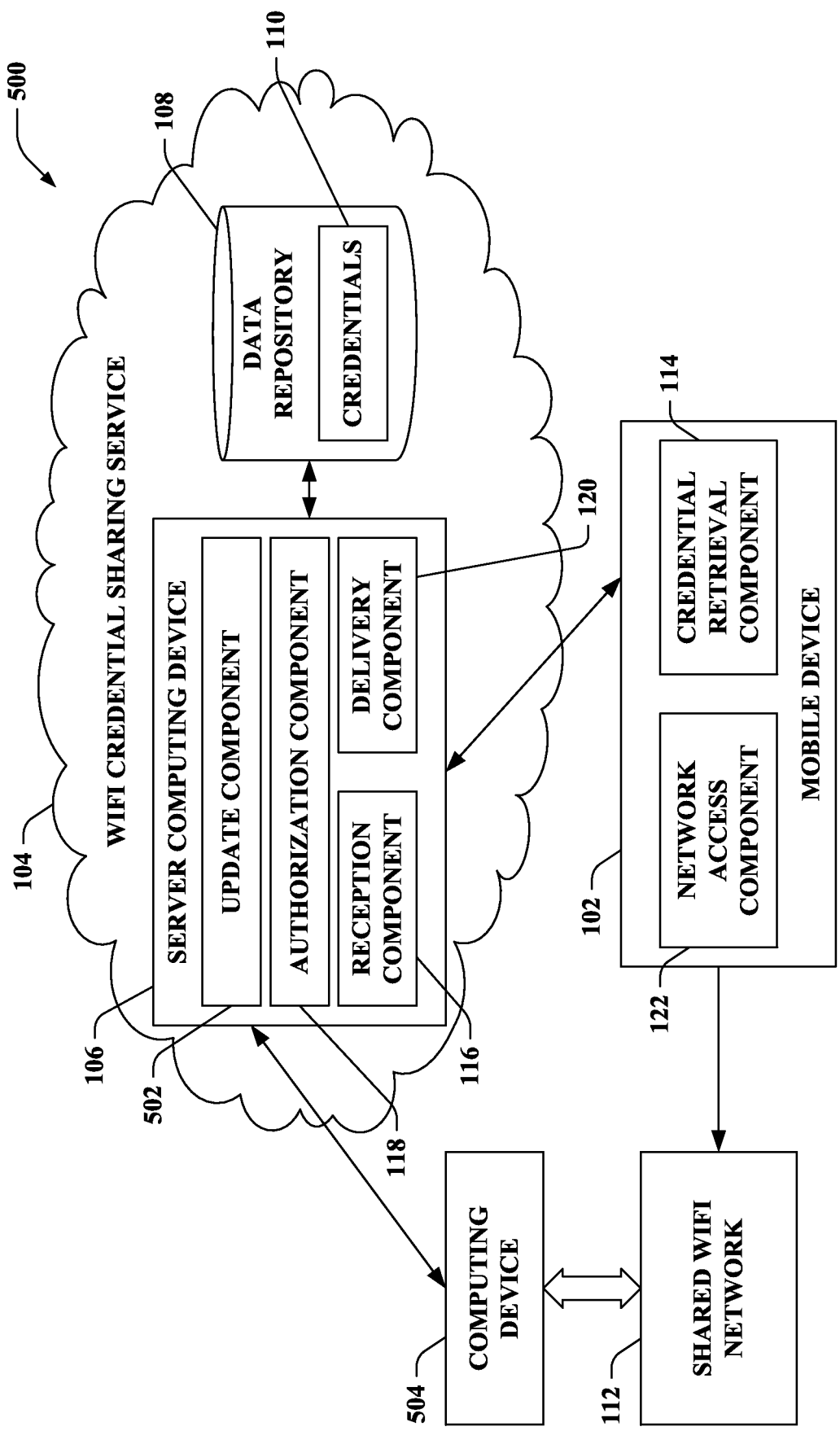
FIG. 5 illustrates a functional block diagram of an exemplary system that delivers updated credentials to the mobile device.

Now referring to FIG. 5, illustrated is a system 500 that delivers updated credentials to the mobile device 102. The server computing device 106 can again include the reception component 116, the authorization component 118, and the delivery component 120. Moreover, the server computing device 106 can include an update component 502 that can receive updated credentials for the shared WiFi network 112 from a computing device 504. The update component 502 can replace the credentials 110 for the shared WiFi network 112 in the data repository 108 with the updated credentials for the shared WiFi network 112 received from the computing device 504. For instance, the computing device 504 can be a computing device of an owner of the shared WiFi network 112 or substantially any other user authorized to modify the credentials 110 of the shared WiFi network 112.

Responsive to receiving the updated credentials from the computing device 504, the authorization component 118 can determine that the mobile device 102 is authorized to receive the updated credentials for the shared WiFi network 112. Moreover, the update component 502 can cause the delivery component 120 to transmit the updated credentials for the shared WiFi network 112 to the mobile device 102 responsive to determining that the mobile device 102 is authorized to receive the updated credentials for the shared WiFi network 112. The credential retrieval component 114 can automatically receive the updated credentials for the shared WiFi network 112 (e.g., without sending a subsequent request for such credentials). Moreover, the network access component 122 can access the shared WiFi network 112 using the updated credentials for the shared WiFi network 112.

Figure 6:
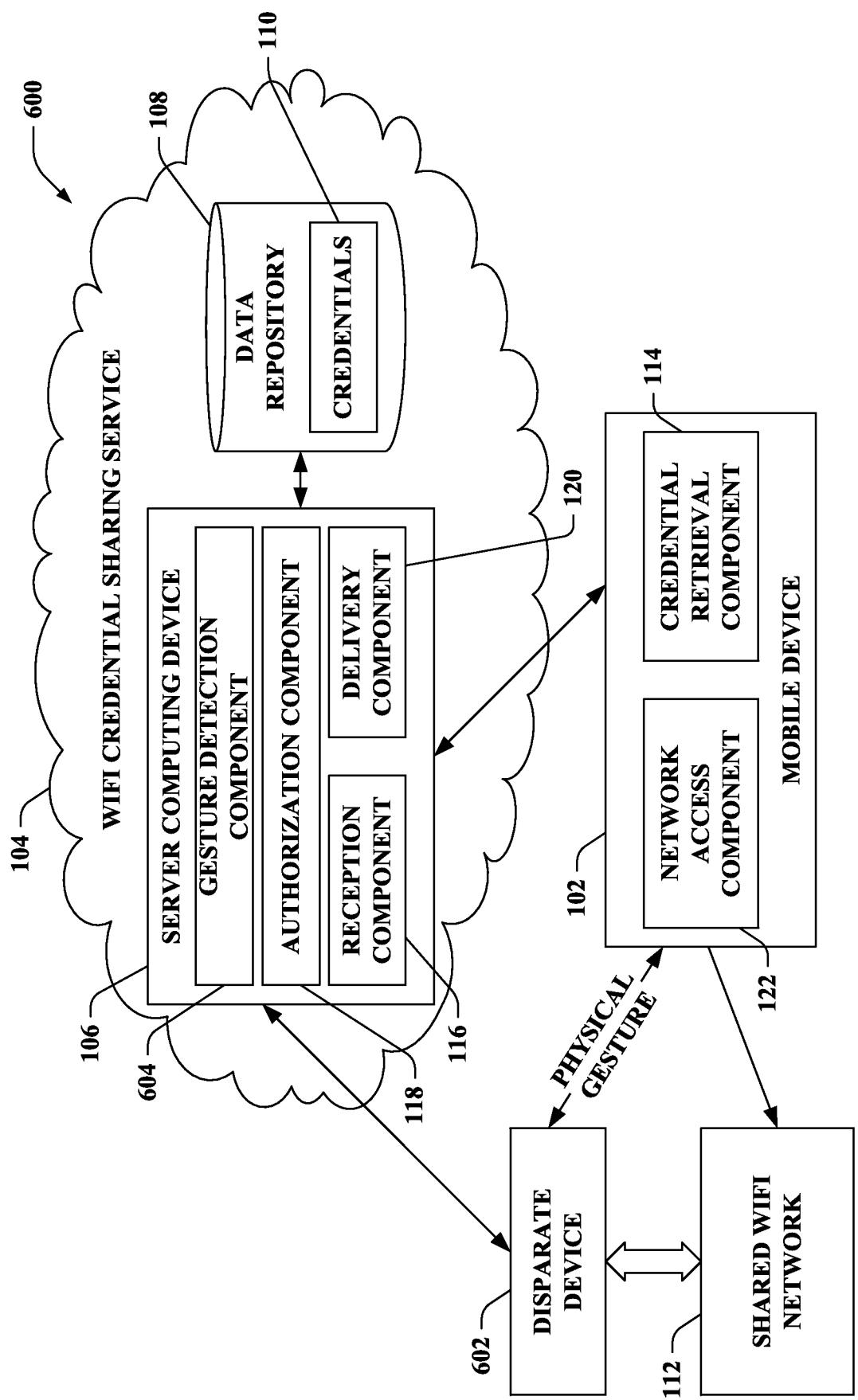
FIG. 6 illustrates a functional block diagram of an exemplary system that delivers the credentials for the shared WiFi network to the mobile device responsive to detection of a physical gesture between the mobile device and a disparate device associated with the shared WiFi network.

Now turning to FIG. 6, illustrated is a system 600 that delivers the credentials 110 for the shared WiFi network 112 to the mobile device 102 responsive to detection of a physical gesture between the mobile device 102 and a disparate device 602 associated with the shared WiFi network 112. According to an example, the disparate device 602 can be a computing device that grants access to the shared WiFi network 112. According to another example, the disparate device 602 can be a network device (e.g., wireless access point) associated with the shared WiFi network 112.

The system 600 includes the WiFi credential sharing service 104, which further includes the one or more server computing devices 106. The server computing device 106 includes the reception component 116, the authorization component 118, and the delivery component 120. Moreover, the server computing device 106 can include a gesture detection component 604 that can detect the physical gesture between the mobile device 102 and the disparate device 602 based at least in part upon physical gesture related data pertaining to the mobile device 102. More particularly, the request sent from the mobile device 102 can include the physical gesture related data pertaining to the mobile device 102. Moreover, it is contemplated that the gesture detection component 604 can receive physical gesture related data pertaining to the disparate device 602 from the disparate device; yet, the claimed subject matter is not so limited.

Responsive to the detection of the physical gesture by the gesture detection component 604, the authorization component 118 can determine that the mobile device 102 is authorized to receive the credentials 110 for the shared WiFi network 112. Accordingly, the delivery component 120 can transmit the credentials 110 for the shared WiFi network 112 to the mobile device 102 responsive to such determination by the authorization component 118. Further, the credential retrieval component 114 can receive the credentials 110 for the shared WiFi network 112 (e.g., from the delivery component 120) responsive to the physical gesture between the mobile device 102 and the disparate device 602.

The gesture detection component 604 can detect substantially any type of physical gesture between the mobile device 102 and the disparate device 602. For instance, the gesture detection component 604 can detect a tap between the mobile device 102 and the disparate device 602. According to another example, the gesture detection component 604 can detect motion of the mobile device 102 relative to the disparate device 602 and/or motion of the disparate device 602 relative to the mobile device 102. It is to be appreciated, however, that other types of physical gestures between the mobile device 102 and the disparate device 602 can be detected by the gesture detection component 604. Yet, a physical gesture between the mobile device 102 and the disparate device 602 as described herein differs from activation of a button of the mobile device 102 and/or a button of the disparate device 602; for instance, a physical gesture as described herein is not intended to include activation of a touchscreen button (e.g., a button displayed on a touchscreen of the mobile device 102, a button displayed on a touch screen of the disparate device 602, etc.).

For example, near field communication (NFC) can be used to detect a tap between the mobile device 102 and the disparate device 602. In accordance with another example, the gesture detection component 604 can detect the physical gesture based upon strength of a signal received by the mobile device 102. By way of a further example, output of an accelerometer and/or gyroscope included in the mobile device 102 and/or the disparate device 602 can be utilized to detect the physical gesture. However, the claimed subject matter is not limited to the foregoing examples.

Figure 7:
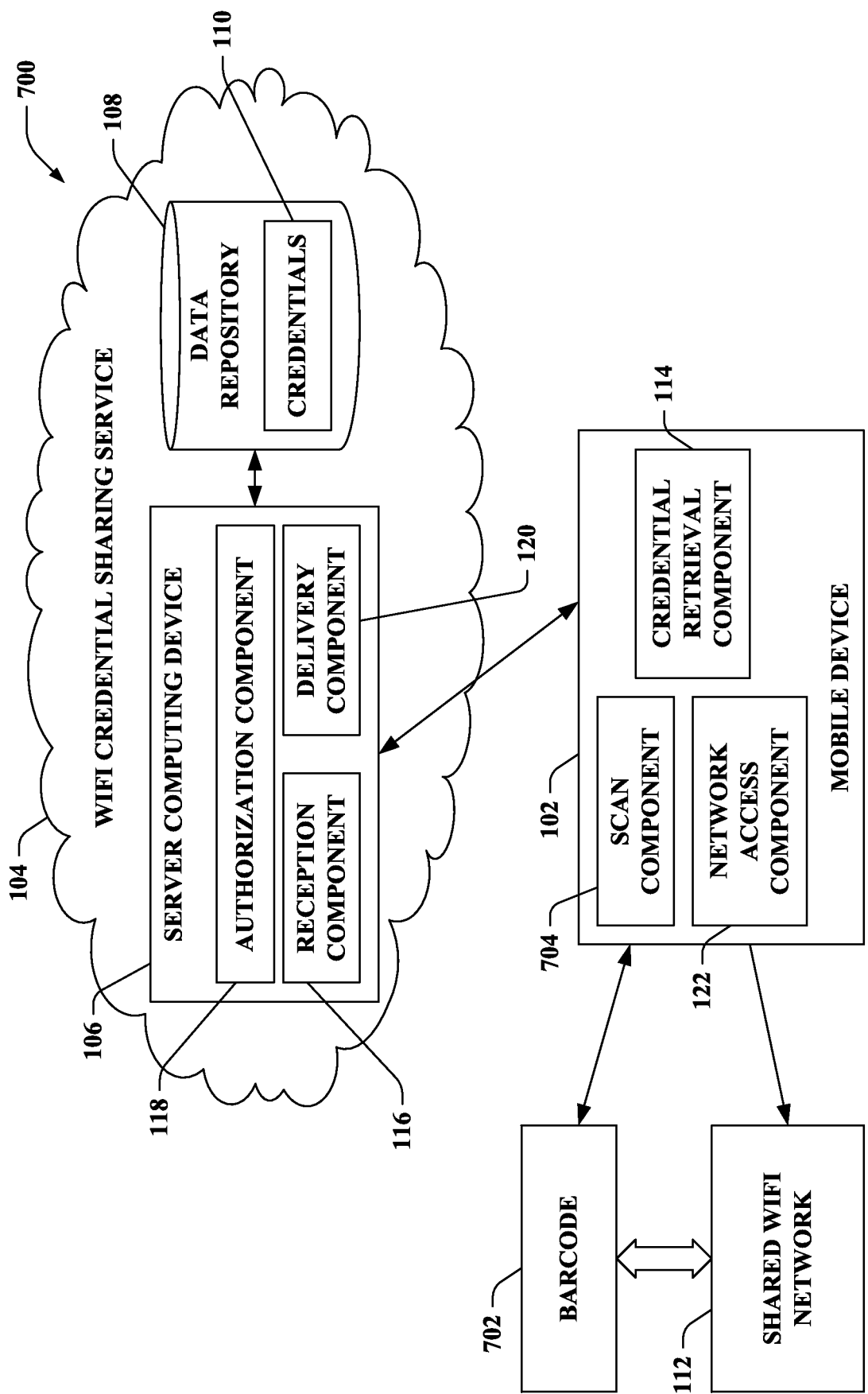
FIG. 7 illustrates a functional block diagram of an exemplary system that delivers the credentials for the shared WiFi network to the mobile device responsive to data that identifies the shared WiFi network read by the mobile device from a barcode associated with the shared WiFi network.

Referring now to FIG. 7, illustrated is a system 700 that delivers the credentials 110 for the shared WiFi network 112 to the mobile device 102 responsive to data that identifies the shared WiFi network 110 read by the mobile device 102 from a barcode 702 associated with the shared WiFi network 112. The barcode 702 can be substantially any type of one dimensional or two dimensional barcode. By way of illustration, the barcode 702 can be a Quick Response (QR) code; yet, other types of barcodes are intended to fall within the scope of the hereto appended claims.

In the example set forth in FIG. 7, the mobile device 102 can further include a scan component 704 that reads the barcode 702 associated with the shared WiFi network 112 to obtain data that identifies the shared WiFi network 112. The credential retrieval component 114 can transmit the data that identifies the shared WiFi network 112 as part of the request sent to the server computing device 106. Thus, the reception component 116 can receive the request, which includes the data that identifies the shared WiFi network 112 read by the scan component 704 of the mobile device 102 from the barcode 702.

Moreover, the authorization component 118 can determine that the mobile device 102 is authorized to receive the credentials 110 for the shared WiFi network 112. According to an example, the authorization component 118 can determine that the mobile device 102 is authorized to receive the credentials 110 based upon the data that identifies the shared WiFi network read from the barcode 702 (e.g., the data that identifies the shared WiFi network read from the barcode 702 can be a token used by the mobile device 102 to retrieve the credentials 110 from the WiFi credential sharing service 104); however, the claimed subject matter is not so limited. Further, the delivery component 120 can transmit the credentials 110 for the shared WiFi network 112 to the mobile device 102 responsive to the authorization component 118 determining that the mobile device 102 is authorized to receive the credentials 110 for the shared WiFi network 112.

Figure 8:
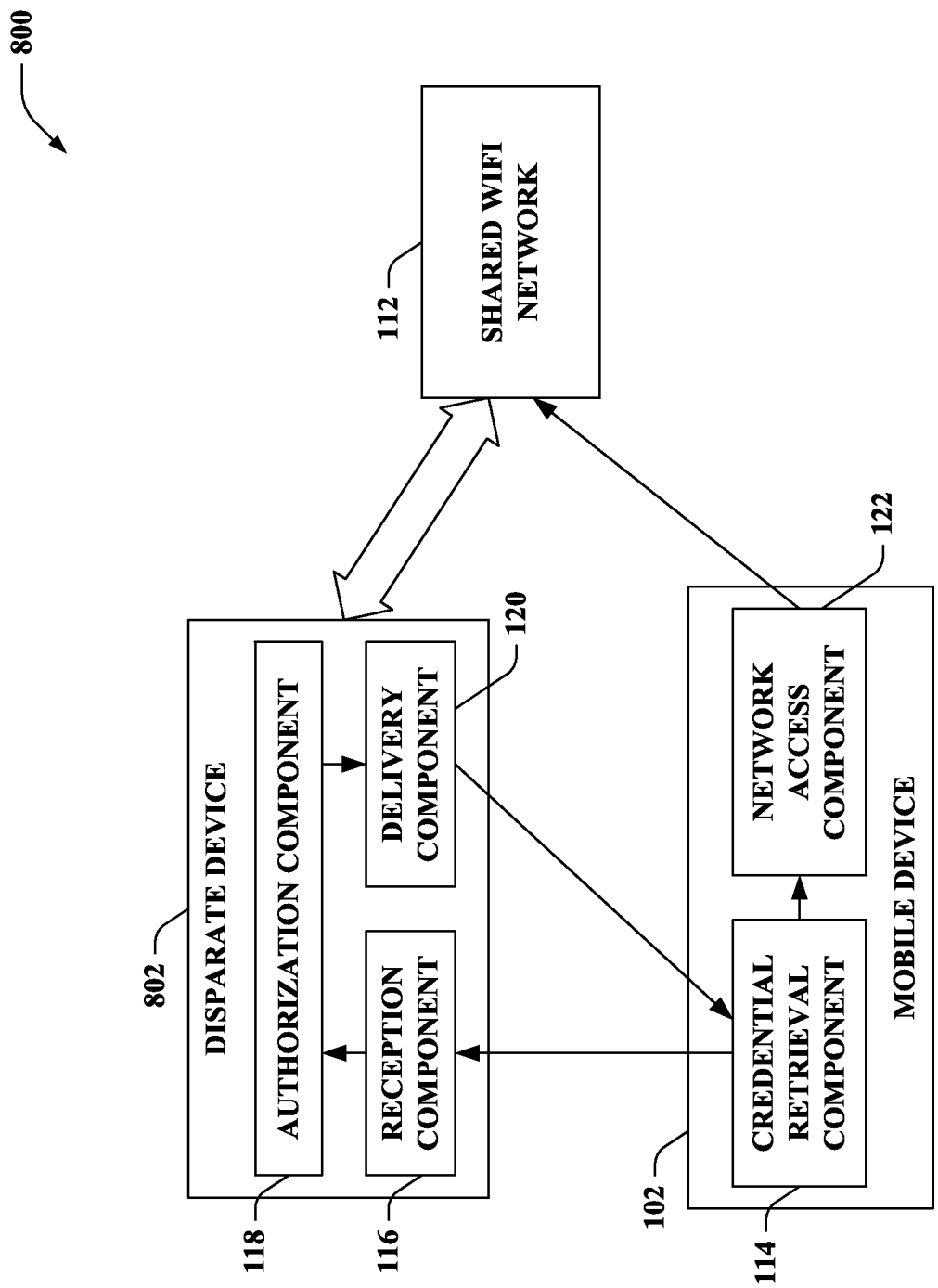
FIG. 8 illustrates a functional block diagram of an exemplary system that delivers the credentials for the shared WiFi network from a disparate device associated with the shared WiFi network to the mobile device.

Turning to FIG. 8, illustrated is a system 800 that delivers credentials for the shared WiFi network 112 from a disparate device 802 associated with the shared WiFi network 112 to the mobile device 102. The disparate device 802 can be a computing device that grants access to the shared WiFi network 112. According to another example, the disparate device 802 can be a network device (e.g., wireless access point) associated with the shared WiFi network 112. The disparate device 802 can include the reception component 116, the authorization component 118, and the delivery component 120. Accordingly, various examples set forth herein where credentials are sent from the server computing device 106 of the WiFi credential sharing service 104 to the mobile device 102 can be extended to scenarios where credentials for the shared WiFi network 112 are delivered from the disparate device 802 to the mobile device 102.

The credentials for the shared WiFi network 112 can be delivered by the disparate device 802 to the mobile device 102 via various mechanisms. Such mechanisms can be based on, for example, geographic location of the mobile device 102 or a physical gesture between the mobile device 102 and the disparate device 802. According to other examples, the credentials can be delivered using an SMS message, an email message, a text-based message sent via an online social networking service, geocaching, a scanned barcode, or the like. Moreover, it is again contemplated that the credentials delivered from the disparate device 802 to the mobile device 102 can be masked; yet, it is to be appreciated that the credentials need not be masked. Further, a token can be shared with the mobile device 102 instead of the credentials, for instance. According to another example, temporary credentials can be delivered for sharing the shared WiFi network 112 for a limited period of time or a limited number of accesses; however, the claimed subject matter is not limited to the credentials being temporary. Pursuant to a further example, shared WiFi credentials previously delivered by the disparate device 802 to the mobile device 102 can be automatically updated when changed for the shared WiFi network 112.

Figure 9:
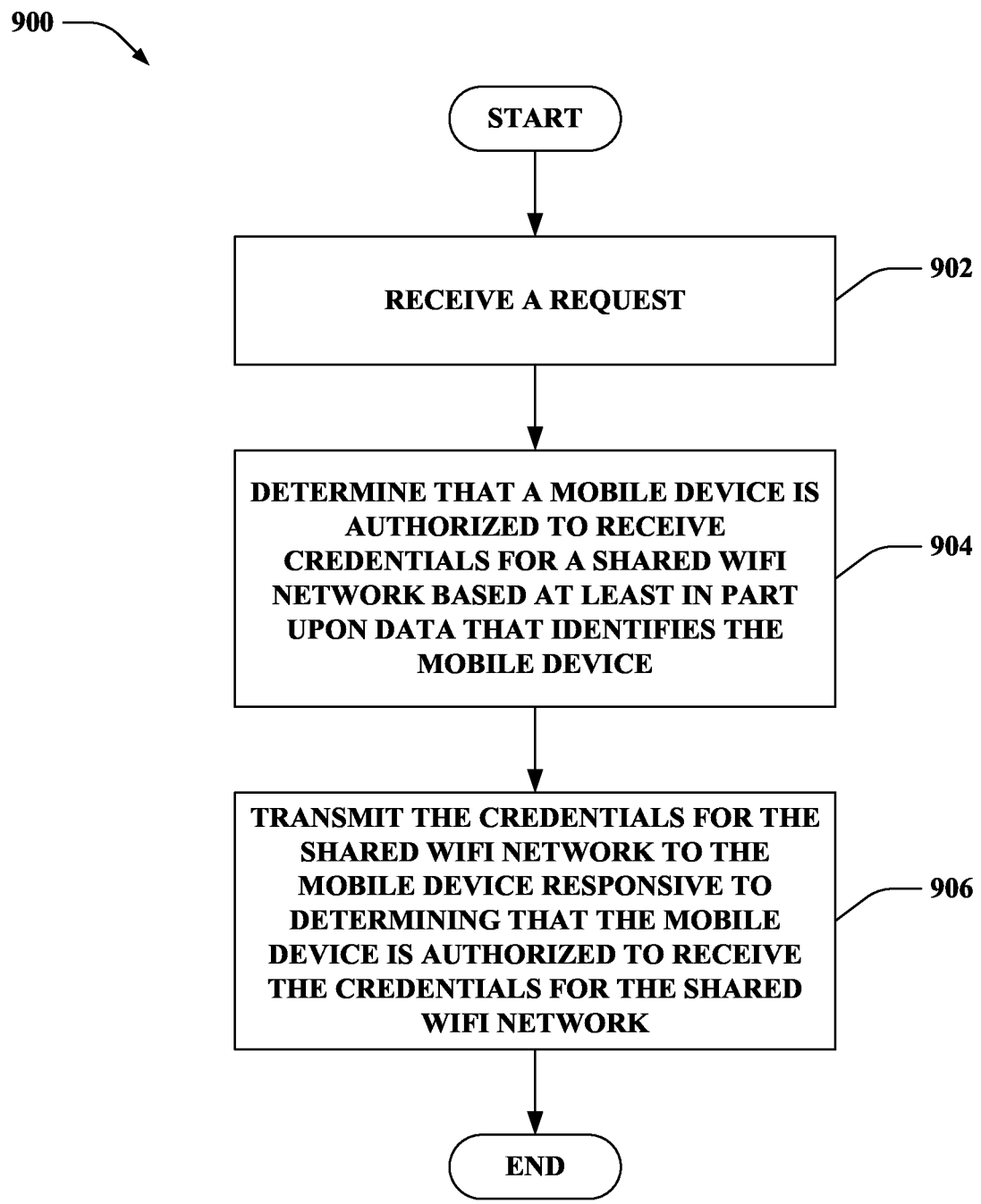
FIG. 9 is a flow diagram that illustrates an exemplary methodology executed by at least one server computing device that is configured to transmit shared WiFi credentials to a mobile device.
Figure 10:
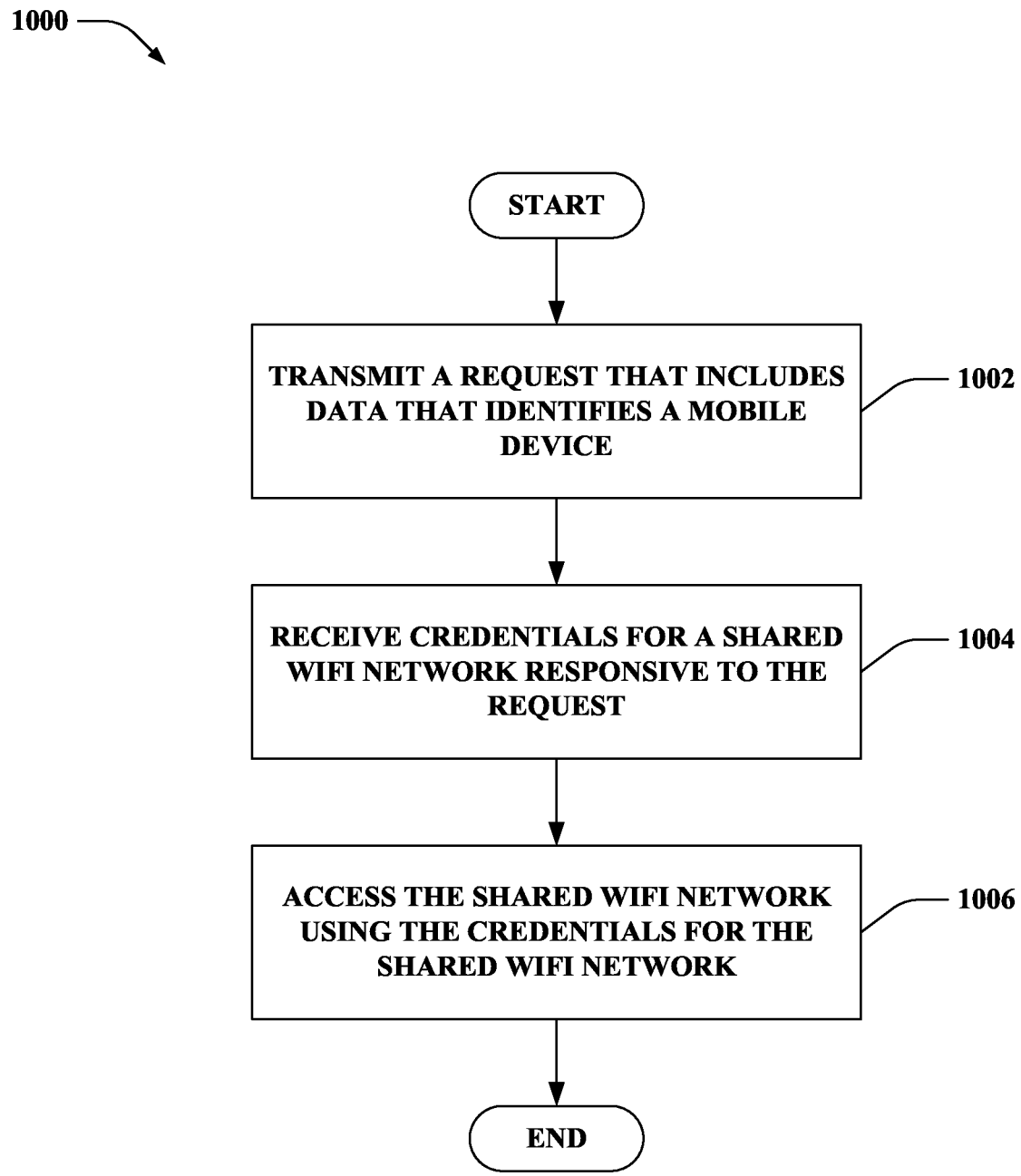
FIG. 10 is a flow diagram that illustrates an exemplary methodology executed by a mobile device that is configured to receive shared WiFi credentials.
Figure 11:
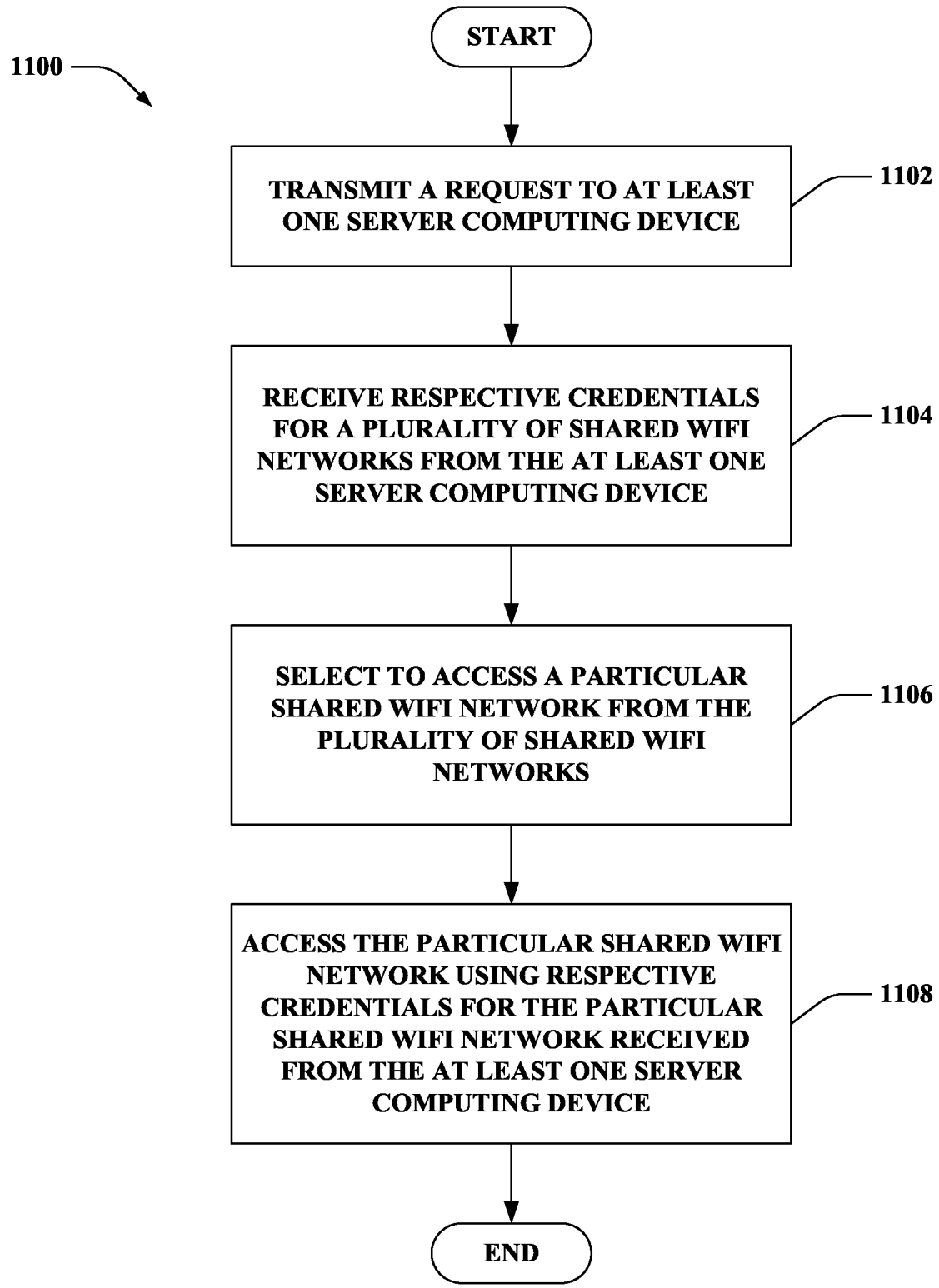
FIG. 11 is a flow diagram that illustrates another exemplary methodology executed by a mobile device that is configured to receive shared WiFi credentials.

FIGS. 9-11 illustrate exemplary methodologies relating to delivering shared WiFi credentials. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 executed by at least one server computing device that is configured to transmit shared WiFi credentials to a mobile device. At 902, a request can be received. The request can include data that identifies the mobile device. Moreover, the request can indicate that the mobile device desirably receives credentials for a shared WiFi network. At 904, responsive to receiving the request, a determination can be made that the mobile device is authorized to receive the credentials for the shared WiFi network based at least in part upon the data that identifies the mobile device. At 906, the credentials for the shared WiFi network can be transmitted to the mobile device responsive to determining that the mobile device is authorized to receive the credentials for the shared WiFi network.

With reference to FIG. 10, illustrated is a methodology 1000 executed by a mobile device that is configured to receive shared WiFi credentials. At 1102, a request that includes data that identifies the mobile device can be transmitted. The request, for instance, can be transmitted to at least one server computing device of a WiFi credential sharing service. According to another example, the request can be transmitted to a disparate device associated with a shared WiFi network; following this example, the disparate device can be a computing device that grants access to the shared WiFi network or a network device (e.g., wireless access point) associated with the shared WiFi network. At 1004, credentials for a shared WiFi networks can be received responsive to the request. At 1006, the shared WiFi network can be accessed using the credentials for the shared WiFi network.

Now turning to FIG. 11, illustrated is a methodology 1100 executed by a mobile device that is configured to receive shared WiFi credentials. At 1102, a request can be transmitted to at least one server computing device. The request can include data that identifies a mobile device. Moreover, the request can indicate that the mobile device desirably receives credentials for a shared WiFi network. At 1104, respective credentials for a plurality of shared WiFi networks can be received from the at least one server computing device. The mobile device can be within geographic proximity of the plurality of shared WiFi networks. At 1106, a particular shared WiFi network from the plurality of shared WiFi networks can be selected to be accessed. At 1108, the particular shared WiFi network can be accessed using respective credentials for the particular shared WiFi network received from the at least one server computing device.

Figure 12:
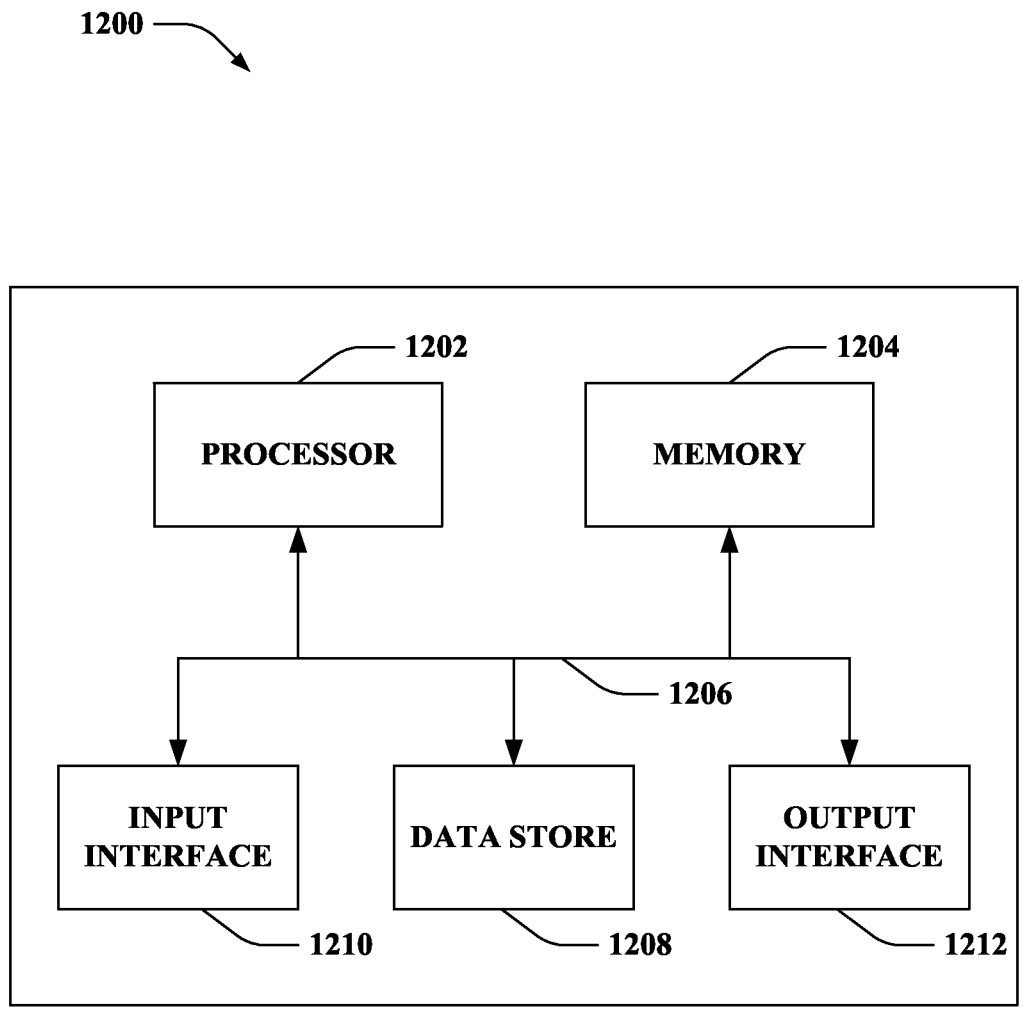
FIG. 12 illustrates an exemplary computing device.

Referring now to FIG. 12, a high-level illustration of an exemplary computing device 1200 that can be used in accordance with the systems and methodologies disclosed herein is illustrated. The computing device 1200 can be used in a system that delivers shared WiFi credentials to a mobile device. The computing device 1200, for example, may be the server computing device 106, the mobile device 102, the computing device 402, the computing device 504, the disparate device 602, or the disparate device 802 described herein. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store credentials, data that identifies mobile devices, tokens, and so forth.

The computing device 1200 additionally includes a data store 1208 that is accessible by the processor 1202 by way of the system bus 1206. The data store 1208 may include executable instructions, credentials, data that identifies mobile devices, tokens, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method executed by at least one server computing device that is configured to transmit shared WiFi credentials to a mobile device, the method comprising:
   receiving a request, the request comprising data that identifies the mobile device, the request indicating that the mobile device desirably receives credentials for a shared WiFi network;
   responsive to receiving the request, determining that the mobile device is authorized to receive the credentials for the shared WiFi network based at least in part upon the data that identifies the mobile device, wherein determining that the mobile device is authorized to receive the credentials for the shared WiFi network further comprises:
      responsive to receiving the request, transmitting an inquiry to a computing device that grants access to the shared WiFi network while the computing device is disconnected from the shared WiFi network, the inquiry indicating that the mobile device desirably receives the credentials for the shared WiFi network, the inquiry causes the computing device that grants access to the shared WiFi network to display:
         information that specifies a social network relationship between a user of the mobile device and a user of the computing device; and
         information that solicits user input to the computing device to grant or deny access for the mobile device to the shared WiFi network; and
      responsive to the inquiry and while the computing device is disconnected from the shared WiFi network, receiving a response from the computing device that indicates that the mobile device is authorized to receive the credentials for the shared WiFi network when the user input to the computing device grants access for the mobile device to the shared WiFi network; and
   transmitting the credentials for the shared WiFi network to the mobile device responsive to determining that the mobile device is authorized to receive the credentials for the shared WiFi network.

2. The method of claim 1, further comprising:
   responsive to receiving the request, identifying a geographic location of the mobile device;
   determining that the mobile device is within geographic proximity of the shared WiFi network based at least in part upon the geographic location of the mobile device; and
   transmitting the credentials for the shared WiFi network to the mobile device responsive to determining that the mobile device is within geographic proximity of the shared WiFi network and authorized to receive the credentials for the shared WiFi network.

3. The method of claim 1, wherein the credentials for the shared WiFi network are temporary credentials that expire after a predetermined duration of time.

4. The method of claim 1, wherein the request is received as part of at least one of a Short Message Service (SMS) message, an email message, or a text-based message sent via an online social networking service from the mobile device.

5. The method of claim 1, wherein the request further comprises data that identifies the shared WiFi network read by the mobile device from a barcode associated with the shared WiFi network.

6. The method of claim 1, wherein the credentials for the shared WiFi network are transmitted to the mobile device as part of at least one of a Short Message Service (SMS) message, an email message, or a text-based message sent via an online social networking service.

7. The method of claim 1, further comprising:
   receiving updated credentials for the shared WiFi network;
   responsive to receiving the updated credentials, determining that the mobile device is authorized to receive the updated credentials for the shared WiFi network; and
   transmitting the updated credentials for the shared WiFi network to the mobile device responsive to determining that the mobile device is authorized to receive the updated credentials for the shared WiFi network.

8. The method of claim 1, wherein the request further comprises physical gesture related data pertaining to the mobile device, the method further comprising:
   detecting a physical gesture between the mobile device and a disparate device based at least in part upon the physical gesture related data pertaining to the mobile device, wherein the disparate device is at least one of the computing device that grants access to the shared WiFi network or a network device associated with the shared WiFi network; and
   responsive to the detection of the physical gesture, determining that the mobile device is authorized to receive the credentials for the shared WiFi network.

9. The method of claim 1, wherein the inquiry transmitted to the computing device that grants access to the shared WiFi network specifies the social network relationship between the user of the mobile device and the user of the computing device, and wherein the user of the mobile device is detected from the data that identifies the mobile device.

10. The method of claim 1, wherein the credentials for the shared WiFi network are temporary credentials that expire after a preset number of uses for access to the shared WiFi network.

11. The method of claim 1, wherein the credentials for the shared WiFi network are transmitted to the mobile device as part of a token, and wherein the token is usable to access the shared WiFi network.

12. The method of claim 1, wherein the credentials for the shared WiFi network transmitted to the mobile device are encrypted.

13. A server computing device, comprising:
at least one processor; and
memory that comprises computer-executable instructions that, when executed by the at least one processor, cause the at least one processor to perform acts including:
receiving a request for shared WiFi credentials for a mobile device, the request comprising data that identifies the mobile device;
responsive to receiving the request, determining that the mobile device is authorized to receive credentials for a shared WiFi network based at least in part upon the data that identifies the mobile device, wherein determining that the mobile device is authorized to receive the credentials for the shared WiFi network further comprises:
responsive to receiving the request, transmitting an inquiry to a computing device that grants access to the shared WiFi network while the computing device is disconnected from the shared WiFi network, the inquiry indicating that the mobile device desirably receives the credentials for the shared WiFi network, the inquiry comprises information that specifies a relationship between a user of the mobile device and a user of the computing device; and
responsive to the inquiry and while the computing device is disconnected from the shared WiFi network, receiving a response from the computing device that indicates that the mobile device is authorized to receive the credentials for the shared WiFi network when user input to the computing device grants access for the mobile device to the shared WiFi network; and
transmitting the credentials for the shared WiFi network to the mobile device responsive to determining that the mobile device is authorized to receive the credentials for the shared WiFi network.

14. The server computing device of claim 13, wherein the request indicates that the mobile device desirably receives credentials for the shared WiFi network.

15. The server computing device of claim 13, the memory further comprises computer-executable instructions that, when executed by the at least one processor, cause the at least one processor to perform acts including:
responsive to receiving the request, identifying the shared WiFi network based on a geographic location of the mobile device.

16. The server computing device of claim 13, wherein the credentials for the shared WiFi network are temporary credentials that expire after a predetermined duration of time.

17. The server computing device of claim 13, wherein the credentials for the shared WiFi network are temporary credentials that expire after a preset number of uses for access to the shared WiFi network.

18. The server computing device of claim 13, wherein the request is received as part of a message sent via an online social network service from the mobile device.

19. The server computing device of claim 13, wherein the credentials for the shared WiFi network are transmitted as part of a message sent via an online social networking service.

20. A computing device, comprising:
a display;
at least one processor; and
memory that comprises computer-executable instructions that, when executed by the at least one processor, cause the at least one processor to perform acts including:
receiving an inquiry from at least one server computing device, the inquiry indicating that a mobile device desirably receives credentials for a shared WiFi network, the inquiry being received while the computing device is disconnected from the shared WiFi network, the computing device controls granting access to the shared WiFi network;
responsive to receiving the inquiry, displaying on the display:
information that specifies a relationship between a user of the mobile device and a user of the computing device; and
information that solicits user input to the computing device to grant or deny access for the mobile device to the shared WiFi network; and
while the computing device is disconnected from the shared WiFi network;
transmitting a response from the computing device to the at least one server computing device that indicates that the mobile device is authorized to receive the credentials for the shared WiFi network when the user input to the computing device grants access for the mobile device to the shared WiFi network, wherein the response causes the at least one server computing device to transmit the credentials for the shared WiFi network to the mobile device.

* * * * *